United States Patent
Seto

(10) Patent No.: US 7,363,395 B2
(45) Date of Patent: *Apr. 22, 2008

(54) INTERMEDIATE DEVICE CAPABLE OF COMMUNICATING USING DIFFERENT COMMUNICATION PROTOCOLS

(75) Inventor: Pak-Lung Seto, Shrewsbury, MA (US)

(73) Assignee: Intel Corporation, Santa Clara, CA (US)

( * ) Notice: Subject to any disclaimer, the term of this patent is extended or adjusted under 35 U.S.C. 154(b) by 295 days.

This patent is subject to a terminal disclaimer.

(21) Appl. No.: 10/749,493

(22) Filed: Dec. 31, 2003

(65) Prior Publication Data

US 2005/0149656 A1 Jul. 7, 2005

(51) Int. Cl.
*G06F 3/00* (2006.01)

(52) U.S. Cl. .............................. 710/11; 710/29; 710/57; 710/63; 710/310; 710/315

(58) Field of Classification Search .................... 710/8, 710/11, 15, 29, 105, 57, 63, 305, 310, 315
See application file for complete search history.

(56) References Cited

U.S. PATENT DOCUMENTS

| | | | |
|---|---|---|---|
| 6,636,909 B1 * | 10/2003 | Kahn et al. ................... 710/60 |
| 6,654,383 B2 * | 11/2003 | Haymes et al. .............. 370/466 |
| 6,886,057 B2 * | 4/2005 | Brewer et al. ................. 710/63 |
| 6,915,363 B2 * | 7/2005 | Wood et al. ................... 710/74 |
| 7,093,033 B2 * | 8/2006 | Beckett et al. ................ 710/11 |
| 2003/0035504 A1* | 2/2003 | Wong et al. ................. 375/377 |
| 2003/0131301 A1 | 7/2003 | Shimono et al. |

OTHER PUBLICATIONS

"Parallel vs. Serial ATA", Jun. 24, 2003, http://www.directron.com/patasata.html.*
"Fibre Channel Tutorial", Mar. 20, 2003, http://www.recoverdata.com/fc_tutorial.htm.*
*International Search Report*, Dated May 19, 2005, PCT/US2004/043345, 7 pages.
*Written Opinion of the International Searching Authority*, Dated May 19, 2005, PCT/US2004/043345, 5 Pages.
"Networkzone Products for the Week of Nov. 17, 2003", *PMC-Sierra 3-GBITS Mux-Demux for SAS Provides Flexibility and Signal Integrity*, http://www.analogzone.com/netp1117a.htm, (Nov. 10, 2003).
"PMC Sierra News Release", *PMC-Sierra Introduces 3 Gigabit Mux-Demux for SAS*, http://investor.pmc-sierra.com/phoenix.zhtml?c=74533&p=irol-newsArticle&ID=467998&highlight, (Nov. 17, 2003).

(Continued)

*Primary Examiner*—Alford Kindred
*Assistant Examiner*—Chun-Kuan (Mike) Lee
(74) *Attorney, Agent, or Firm*—Caroline M. Fleming

(57) ABSTRACT

A method according to one embodiment may include determining, at least in part, by an intermediate device at least one communication protocol via which at least one storage device connected to the intermediate device is capable of communicating. In this embodiment, the intermediate device may be capable of controlling, at least in part, by the intermediate device, at least one data stream coming from the at least one storage device in accordance with at least one communication protocol. Of course, many alternatives, variations, and modifications are possible without departing from this embodiment.

25 Claims, 4 Drawing Sheets

OTHER PUBLICATIONS

American National Standard for Information Technology- Fibre Channel-Physical and Signalling Interface-3 (FC-PH-3), Developed by incits, Where IT all Begins, Table of Contents, (1998),6 pgs.
PCI Express Base Specification Revision 1.0, PCI Express, Table of Contents, (Jul. 22, 2002), 15 pgs.
PCI-X Addendum to the PCI Local Bus Specification, Revision 1.0a, Table of Contents, (Aug. 24, 2000),9 pgs.
Serial ATA: High Speed Serialized AT Attachment, Serial ATA Workgroup, Revision 1.0, Table of Contents, APT Technologies, Inc.,(Aug. 29, 2001),10 pgs.
Working Draft American National Standard, Project T10/1601-D, Revision 1, Table of Contents, Information Technology- Serial Attached SCSI- 1.1 (SAS- 1.1),(Sep. 18, 2003),24 pgs.

* cited by examiner

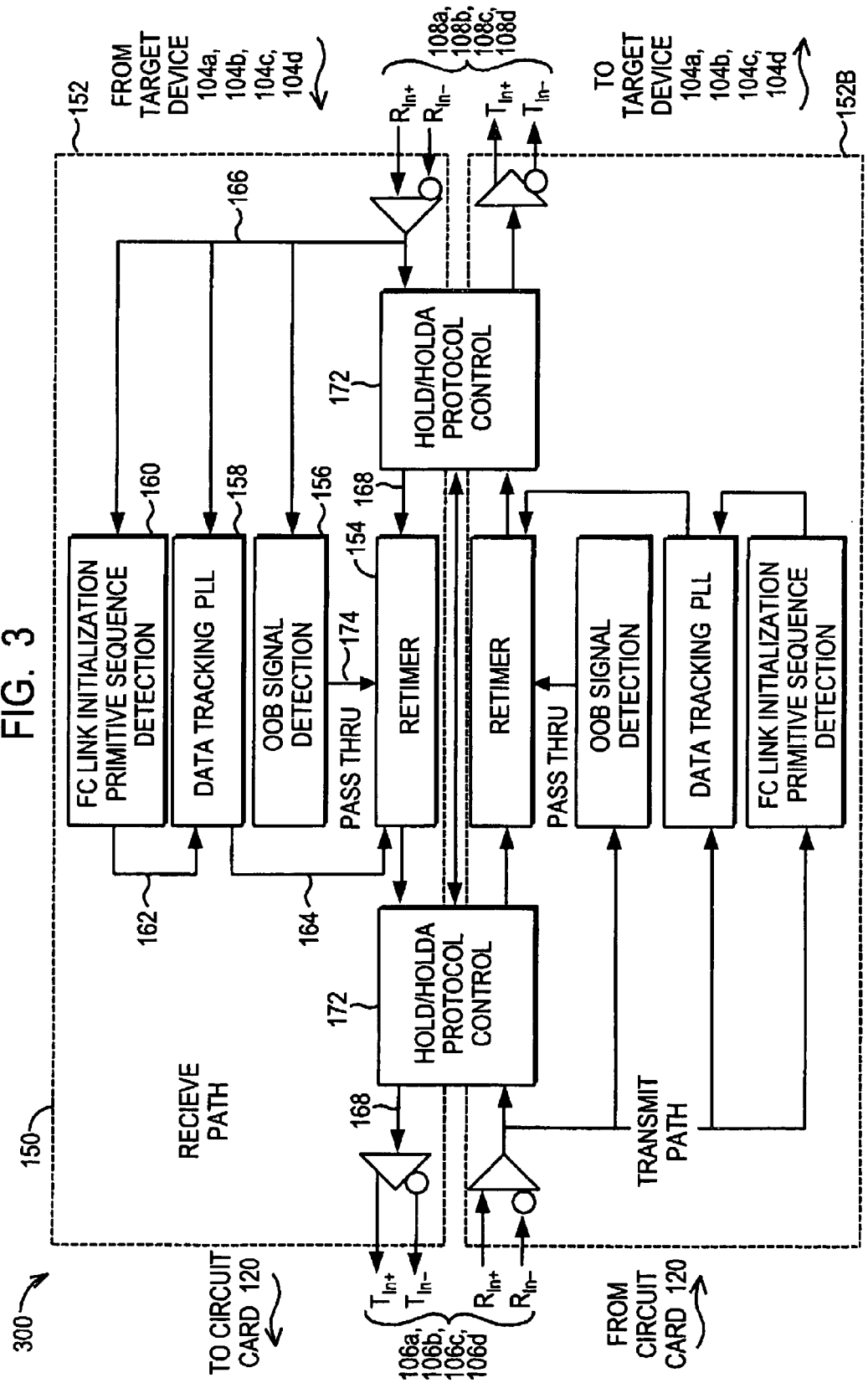

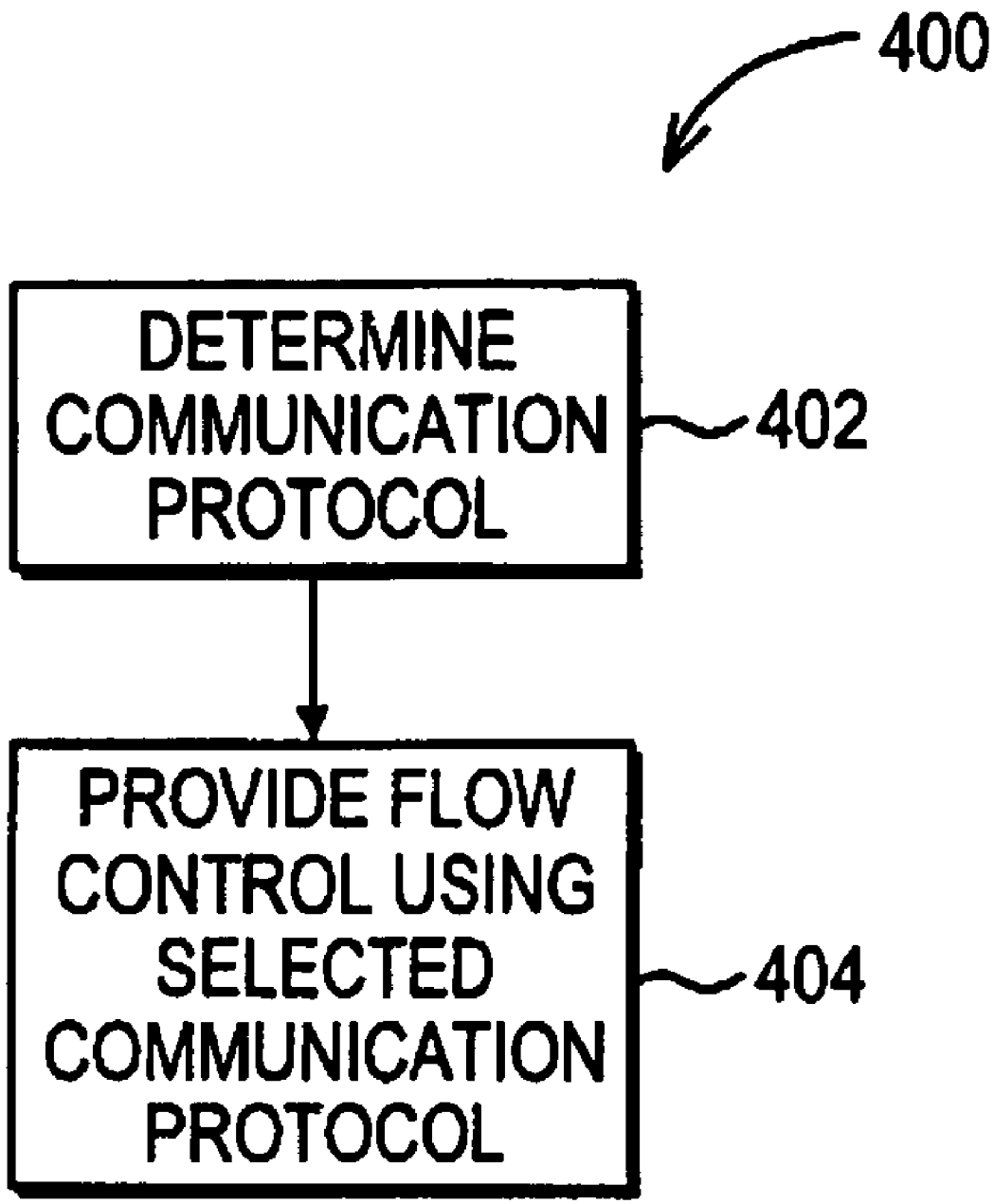

US 7,363,395 B2

INTERMEDIATE DEVICE CAPABLE OF COMMUNICATING USING DIFFERENT COMMUNICATION PROTOCOLS

FIELD

This disclosure relates to an intermediate device that is capable of communicating using different communication protocols.

BACKGROUND

In one conventional data storage arrangement, a computer node includes a host bus adapter (HBA). The HBA communicates with a data storage system via one or more communication links using a communication protocol associated with the one or more links. The physical connection between the HBA and the data storage system typically includes one or more cables designed to carry commands and data between the HBA and the data storage system using a communication protocol. Communicating data over cable may degrade the quality of the signals encoding the data, and this may limit the cable length between an HBA and the data storage system. Additionally, extending the cable length can introduce noise in the data stream between the data storage system and the HBA. Retimers have been employed to reduce jitter and noise in the data stream. However, conventional retimers can communicate using only a single predetermined communication protocol. Thus, in the conventional data storage arrangement, since a retimer is incapable of communicating using different communication protocols, conventional data storage arrangements do not provide a mechanism to extend the cable distance in a data storage arrangement where multiple communication protocols are employed.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

FIG. 3 is a block diagram illustrating an exemplary intermediate device; and

FIG. 4 is a flowchart illustrating exemplary operations that may be performed according to an embodiment.

Although the following Detailed Description will proceed with reference being made to illustrative embodiments, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

Figure 1:
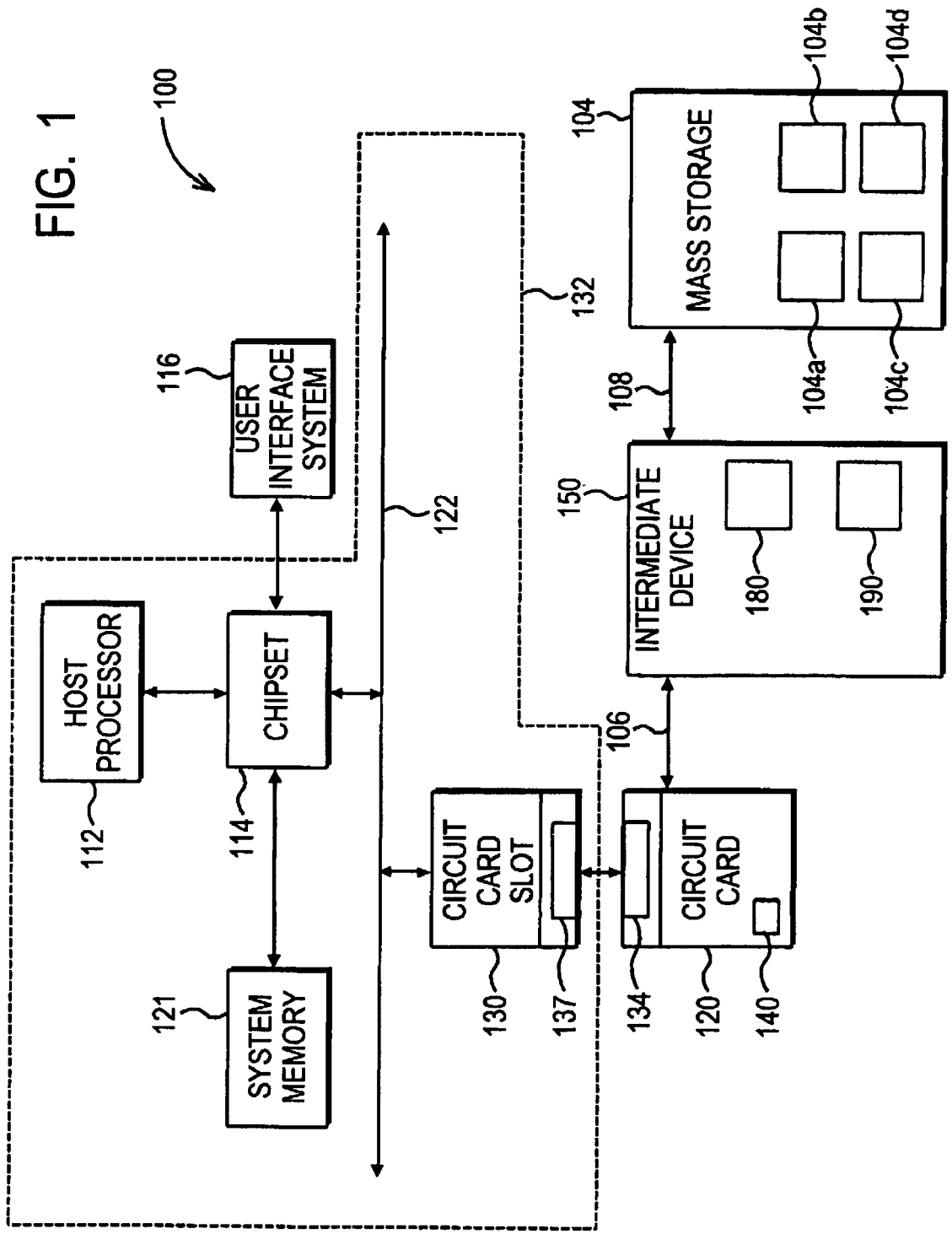
FIG. 1 is a diagram illustrating a system embodiment.

FIG. 1 illustrates a system embodiment 100 of the claimed subject matter. The system 100 may generally include a host processor 112, a bus 122, a user interface system 116, a chipset 114, system memory 121, a circuit card slot 130, and a circuit card 120 that is capable of communicating with the mass storage 104. The host processor 112 may include any variety of processors known in the art such as an Intel® Pentium® IV processor commercially available from the Assignee of the subject application. The bus 122 may include various bus types to transfer data and commands. For instance, the bus 122 may comply with the Peripheral Component Interconnect (PCI) Express™ Base Specification Revision 1.0, published Jul. 22, 2002, available from the PCI Special Interest Group, Portland, Oreg., U.S.A. (hereinafter referred to as a "PCI Express™ bus"). The bus 122 may also comply with the PCI-X Specification Rev. 1.0a, Jul. 24, 2000, available from the aforesaid PCI Special Interest Group, Portland, Oreg., U.S.A. (hereinafter referred to as a "PCI-X bus").

The user interface 116 may include a variety of devices for human users to input commands and/or data and to monitor the system such as a keyboard, pointing device, and video display. The chipset 114 may include host bridge/hub system (not shown) that couples the processor 112, system memory 121, and user interface system 116 to each other and to the bus 122. Chipset 114 may include integrated circuit chips, such as those selected from integrated circuit chipsets commercially available from the assignee of the subject application (e.g., graphics memory and I/O controller hub chipsets), although other integrated circuit chips may also, or alternatively be used. The processor 112, system memory 121, chipset 114 and circuit card slot 130 may be integrated onto one motherboard 132.

The circuit card 120 may be constructed to permit it to be inserted into slot 130. When the circuit card 120 is properly inserted into slot 130, connectors 134 and 137 become electrically and mechanically coupled to each other. When connectors 134 and 137 are so coupled to each other, the card 120 becomes electrically coupled to bus 122 and may exchange data and/or commands with system memory 121, host processor 112, and/or user interface system 116 via bus 122 and chipset 114. Alternatively, without departing from this embodiment, the operative circuitry of the circuit card 120 may be included in other structures, systems, and/or devices. These other structures, systems, and/or devices may be, for example, in the motherboard 132, coupled to the bus 122. Processor 112, system memory 121, chipset 114, bus 122, and circuit card slot 130 may be comprised in a single circuit board, such as, for example, a system motherboard. Alternatively, and without departing from this embodiment, circuit card 120 may comprise one or more chipsets comprised in the system motherboard.

The circuit card 120 may communication with the mass storage 104 using a plurality of communication protocols. The circuit card 120 may comprise one or more of a protocol initiator engine 140 that is adapted to initiate communication between the host system 132 and the mass storage 104. The initiator engine may comprise an integrated circuit that may include circuitry that is capable of initiating communication between the host system 132 and the mass storage 104.

If a Fibre Channel (FC) protocol is used by circuit card 120 to exchange data and/or commands with mass storage 104, it may comply or be compatible with the interface/protocol described in ANSI Standard Fibre Channel Physical and Signaling Interface-3 X3.303:1998 Specification. Alternatively or additionally, if a serial ATA (S-ATA) protocol is used by controller circuit card 120 to exchange data and/or commands with mass storage 104, it may comply or be compatible with the protocol described in "Serial ATA: High Speed Serialized AT Attachment," Revision 1.0, published on Aug. 29, 2001 by the Serial ATA Working Group. Further alternatively or additionally, if a serial attached small computer system interface (SAS) protocol is used by controller circuit card 120 to exchange data and/or commands with mass storage 104, it may comply or be compatible with the protocol described in "Information Technology—Serial Attached SCSI—1.1," Working Draft American National Standard of International Committee For Information Technology Standards (INCITS) T10 Technical Committee, Project T10/1562-D, Revision 1, published Sep. 18, 2003, by American National Standards Institute (hereinafter termed the "SAS Standard") and/or later-published versions of the SAS Standard. The SAS protocol may comprise Serial Advanced Attachment (ATA) Tunneled Protocol (STP) and Serial Small Computer System Interface (SCSI) Protocol (SSP).

Mass storage 104 may include one or more mass storage devices, e.g., mass storage devices 104a, 104b, 104c and/or 104d. Mass storage 104 may comprise one or more redundant array of independent disks (RAID) and/or peripheral devices. One or more of the storage devices 104a, 104b, 104c, and/or 104d may comply or be compatible with FC communication protocols, S-ATA communication protocols, and/or SAS communication protocols. Of course, alternatively, circuit card 120 may exchange data and/or commands with mass storage 104 using other and/or additional communication protocols, without departing from this embodiment. Mass storage devices included in mass storage 104 may be comprised in one or more respective enclosures that may be separate from the enclosure in which the motherboard and the components comprised in the motherboard are enclosed. Alternatively, and without departing from any embodiment described herein, mass storage 104 may comprise one or more stand alone devices. One or more mass storage devices, for example storage devices 104a, 104b, 104c and/or 104d, may be referred to herein as "target device" or "target devices", and it is intended that these terms may be used interchangeably herein.

The present embodiment may also comprise an intermediate device 150 coupled between mass storage 104 and the circuit card 120. As used herein, an "intermediate device" may comprise circuitry to transmit and/or receive at least one signal. As used herein, "circuitry" may comprise, for example, singly or in any combination, hardwired circuitry, programmable circuitry, state machine circuitry, and/or firmware that stores instructions executed by programmable circuitry. For example, in one embodiment, intermediate device 150 may comprise circuitry to communicate commands and/or data sent from the circuit card 120 to a target device comprised in mass storage 104, and vice versa. Further, in at least one embodiment described herein, intermediate device 150 may also comprise circuitry to exchange commands and/or data using a plurality of communication protocols.

Intermediate device 150 may be coupled via one or more communication links between the circuit card 120 and mass storage 104. For example, in one exemplary embodiment, intermediate device may be coupled to one or more cables 106 and 108, where one or more cables 106 may be coupled to the circuit card 120, and one or more cables 108 may be coupled to mass storage 104. For a given communication protocol, conventionally, the maximum practically usable length of physical cable between the circuit card 120 and a target device comprised in mass storage 104 may be limited. For example, conventionally, for devices communication using SAS protocol, cable lengths may be limited to approximately 10 meters, and devices communicating using S-ATA protocol, such cable lengths may be limited to approximately 1 meter. If longer cable lengths are used, the exchange of signals over the longer lengths of cable can create noise effects which may tend to deteriorate the quality of the signal.

Consistent with this embodiment, the intermediate device 150 may comprise flow protocol sensing circuitry 180. "Protocol sensing circuitry", as used in any embodiment herein, may be defined as circuitry that may be operable to detect a communication protocol from among a plurality of communication protocols. For example, in an exemplary embodiment, protocol sensing circuitry 180 may be operable to detect the presence of a FC target device compatible with and/or capable of communicating using a FC communications protocol, a SAS target device compatible with and/or capable of communicating using a SAS communications protocol and/or a S-ATA target device compatible with and/or capable of communicating using a S-ATA communications protocol.

Intermediate device 150 may also comprise data flow control circuitry 190. "Data flow control circuitry", or "flow control circuitry", as used in any embodiment herein, may be defined as circuitry that may control a data stream that may be communicated in accordance with one or more communication protocols. "Control" or "controlling", as used herein with reference to a data stream may mean modifying a signal encoding, at least in part, the stream, to produce a desired effect. For example, in an exemplary embodiment, flow control circuitry 190 may be operable to control the data stream from the circuit card 120 and mass storage 104 (and vice versa) to reduce noise effects contained in a data stream sent from mass storage 104 to circuit card 120, and vice versa.

The intermediate device 150, with reference to any embodiment described herein, may be physically positioned at any point along a cable or group of cables, or at the front end of the a mass storage 104, or in the circuit card 120. Also, if longer cable lengths are needed, more than one intermediate device may be coupled together. In an exemplary embodiment depicted in FIG. 1, the intermediate device 150 may be coupled to cables 106 and 108, for example, in a bridge device (not shown) between two lengths of cable. Alternatively, intermediate device 150 may be comprised in, or directly attached (i.e., not coupled via cable 108) to mass storage 104, or comprised in or directly attached (i.e., not coupled via cable 106) to circuit card 120; in these alternatives, one or more of the cables 106 or 108 may be obviated. Although not shown in the drawings, intermediate device 150 may comprise one or more interface connectors to provide mechanical and electrical connectivity with cable 106 and/or cable108. In that regard, cable 106 and/or cable108 may comply or be compatible with FC protocol, SAS protocol and/or S-ATA communications protocol.

Figure 2:
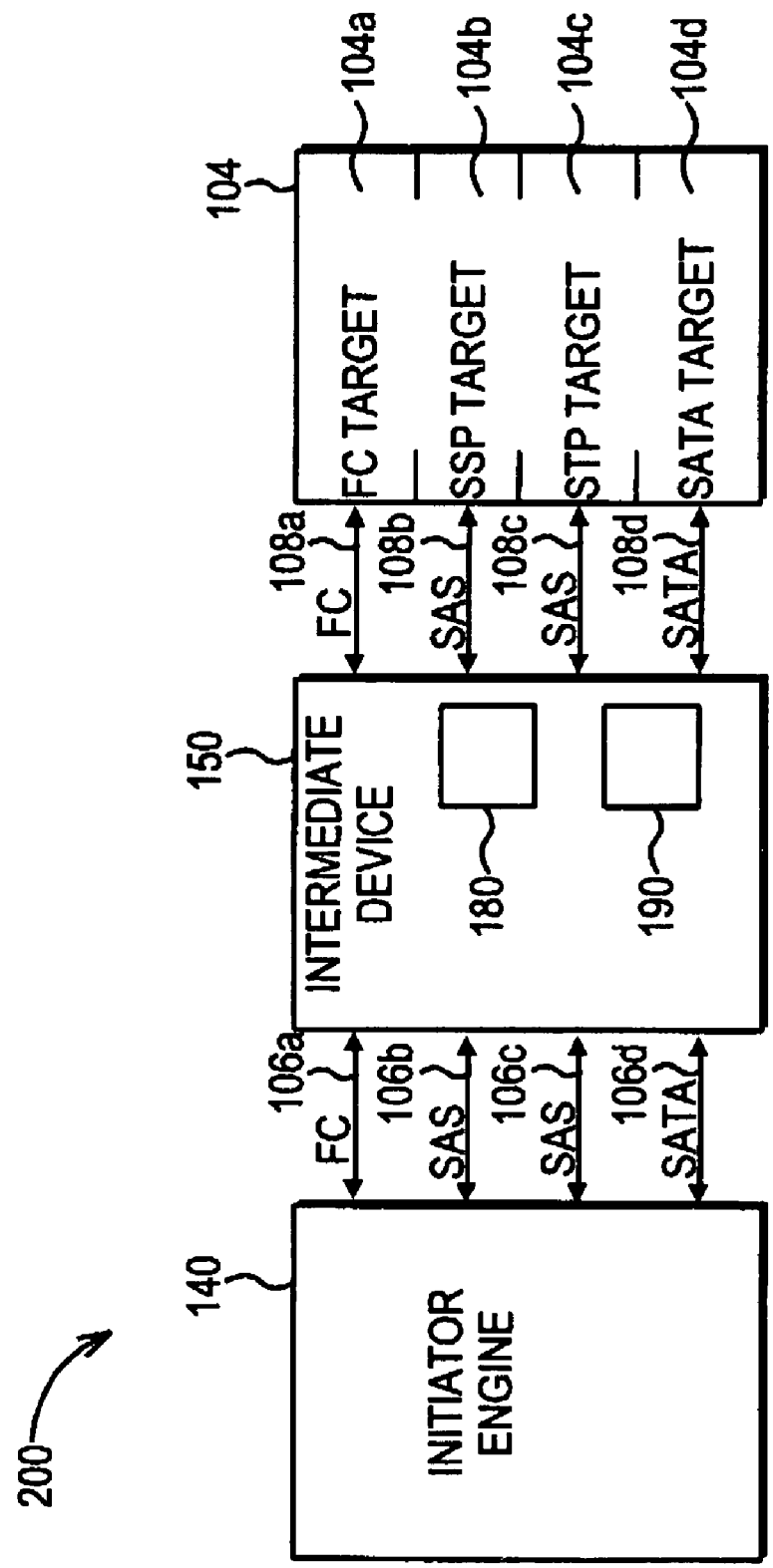
FIG. 2 is a diagram illustrating another system embodiment.

FIG. 2 illustrates another system embodiment 200 of the claimed subject matter. In FIG. 2, certain portions of the system 100 depicted in FIG. 1 have been omitted for clarity (for example circuit board 132 and circuit card 120), but it is to be understood that like parts of FIG. 2 can be implemented in a manner consistent with an embodiment depicted in FIG. 1, or alternatively in other system implementations, without departing from this embodiment.

The system 200 of FIG. 2 may include a protocol initiator engine 140, mass storage 104 and the intermediate device 150 coupled to mass storage 104 and the initiator engine 140 via one or more cables 106a,106b, . . . 106d and/or 108a, 108b, . . . 108d. The multiple protocol initiator engine 140 may comprise circuitry to exchange commands and data with a mass storage 104 using different communications protocols, and such circuitry may comprise an integrated circuit associated with circuit card 120.

In an exemplary embodiment, mass storage 104 comprises a multiple protocol enclosure that may include, or may be capable of accommodating one or more target devices 104a, 104b, 104c and/or 104d. For example, in an embodiment, target device 104a may be a FC device capable of communicating using a FC protocol, target device 104b may be a device capable of communicating using a SAS protocol, target device 104c may be a STP device capable of communicating using a SAS protocol, and target device 104d may be a S-ATA device capable of communicating using a S-ATA protocol.

In this embodiment, for example, cables 106a and 108a may compatible with and/or capable of communicating a FC protocol for communicating with a FC target device, cables 106b and 108b may compatible with and/or capable of communicating a SAS protocol for communicating with a SSP target device, cables 106c and 108c may compatible with and/or capable of communicating a SAS protocol for communicating with a STP target device, and cables 106d and 108d may compatible with and/or capable of communicating a S-ATA protocol for communicating with an S-ATA target device.

Intermediate device 150 may be operable to provide protocol sensing and/or data flow control for a plurality of communication protocols. For example, in an exemplary embodiment, intermediate device 150 may be include circuitry to provide protocol sensing and data flow control for one or more of target devices 104a, 104b, 104c and/or 104d, which may communicate with the intermediate device 150 using FC, SAS and/or S-ATA communication protocols. In an exemplary embodiment, one or more signals transmitted to and/or from the intermediate device 150 (i.e., encoding commands and data to and/or from the initiator engine 140 and/or the target device 104a, 104b . . . 104d) may be retimed in a manner described below to permit, for example, extension of cable lengths between the mass storage 104 and the initiator engine 140.

FIG. 3 is a block diagram 300 of intermediate device 150. As described above, the intermediate device may comprise circuitry to facilitate communication between a plurality of target devices (104a, 104b . . . 104d) and the circuit card 120, and vice versa. As further described above, the target devices 104a, 104b . . . 104d may be housed in an enclosure of mixed devices, for example, devices compatible with and/or capable of communicating using SAS, S-ATA and/or FC protocols. In an exemplary embodiment of FIG. 3, the intermediate device 150 may be operable to dynamically support multiple different communication protocols associated with one or more target devices.

The intermediate device may comprise receive path circuitry 152A and transmit path circuitry 152B. The receive path circuitry 152A comprises a communication path between the target device 104a, 104b . . . 104d and the circuit card 120, where commands and data may be sent from the target device 104a, 104b . . . 104d to the circuit card 120, through the receive path circuitry 152A. The transmit path circuitry 152B, therefore may be a communication path between the target device 104a, 104b . . . 104d and the circuit card 120, where commands and data may be sent from the circuit card 120 to the target device 104a, 104b . . . 104d, through the transmit path circuitry 152B. In accordance with this embodiment, the construction of the transmit path circuitry 152B and the construction of the receive path circuitry 152A may be identical.

The receive path circuitry 152A may comprise protocol sensing circuitry. For example, in this exemplary embodiment, protocol sensing circuitry may comprise OOB signal detection circuitry 156 and FC link initialization primitive sequence detection circuitry 160. Additionally, the protocol sensing circuitry may comprise protocol support circuitry 170 and/or 172.

The receive path circuitry may also comprise data flow control circuitry. Exemplary flow control circuitry may comprise data tracking phase locked loop (PLL) circuitry 158 and retimer circuitry 154.

Exemplary operational aspects of the intermediate device 150 are described below, with reference to a plurality of different communication protocols and with continued reference to FIG. 3.

SAS Protocol Sensing and Flow Control

Assume for this example that an SAS device is connected to the intermediate device 150, either alone or in combination with other device types in a multiple device enclosure (for example, SSP device 104b and/or SST device 104c) as shown in FIG. 2. Commands and data may be communicated into and out of the intermediate device 150, as represented by Rin and Tin, for example, via cable links 106a, 106b . . . 106d and/or 108a, 108b . . . 108d. A data path 166 (e.g., internal bus) may be included in the receive path circuitry 152A to provide communication of commands and data sent from the SAS device to the component circuitry of the receive path circuitry 152A.

When a SAS device is initially powered up, the SAS device transmits a defined sequence of initialization signals. It is assumed that the initialization signal sequence is defined by the conventional SAS protocol, unless stated to the contrary herein. To sense that a SAS device is connected to the intermediate device 150, the receive path circuitry 152A may comprise an OOB signal detection circuitry 156. The OOB signal detection circuitry 156 may be coupled to a data path 166 to an incoming initialization signal sequence from the SAS device. The initialization signal sequence from an SAS device may comprise an OOB (Out-of-Band) primitive signal sequence. An "initialization signal sequence", as used herein may comprise a sequence of signals generated by a device, and may further comprise information contained in such signals identifying the type of device. For example, such a primitive sequence may include a COMSAS signal sequence that identifies the target device as an SAS device. The OOB signal detection circuitry 156 may be operable to receive an OOB signal sequence and generate a pass through command 174 to retimer circuitry 154.

In the case of an SAS device, for example, retimer circuitry 154 may be disabled by the pass through command signal 174 to permit the initialization OOB signal sequence to pass through the intermediate device 150 (via data path 168) to the circuit card 120. The circuit card 120, or ore particularly the initiator protocol engine 140 associated with a circuit card 120, may be adapted to receive the OOB signal sequence (via a cable link extending between the intermediate device 150 and circuit card 120) and may also select an appropriate SAS protocol to commence communication with the SAS device using conventional SAS communication protocols. In this example, the retimer circuitry 154 may comprise buffer and/or amplifying circuitry to buffer and/or amplify the OOB signals passing therethrough.

The receive path circuitry 152A may also include flow control circuitry that may include data tracking PLL circuitry 158 coupled to the internal bus 166. The PLL circuitry 158 may be adapted to receive digital data signals (i.e., data streams) from the SAS device, for example, after the SAS device is properly initialized by the protocol engine 140. Upon receiving a data stream, PLL circuitry 158 may be operable to compare an incoming data stream against an internally generated clock signal (not shown). If a phase difference exists between the internally generated clock signal and the data stream, the PLL circuitry 158 may also be capable of changing the clock frequency to more closely match the frequency of the data stream. The PLL circuitry 158 may also be capable of generating a data clock signal 158 indicative of the frequency of the incoming data stream. The data clock signal 164 may be sent to retimer circuitry 154. The retimer circuitry 154 may be operable to retime the incoming data stream based, at least in part, on the data clock signal 164 received from the PLL circuitry 158. For example, retimer 154 may comprise a flip flop circuit that has the data stream and the data clock signal for inputs, and may operate to retime the data stream based on the data clock signal. The retimer circuitry 154 may further be operable to generate a retimed data stream at the output of the retimer circuitry 154. Retiming the data stream from an SAS device may operate to reduce noise events (for example, ringing effects in the digital signal) which may occur over longer cable lengths. Further, retiming the data stream may operate to reduce these effects below a defined tolerance level.

FC Protocol Sensing and Flow Control

Assume for this example that a FC device is connected to the intermediate device 150, either alone or in combination with other device types in a multiple device enclosure (for example, FC device 104a) as shown in FIG. 2. Commands and data may be communicated into and out of the intermediate device 150, as represented by Rin and Tin, for example, via cable links 106a, 106b . . . 106d and/or 108a, 108b . . . 108d. A data path 166 (e.g., internal bus) may be included in the receive path circuitry 152A to provide communication of commands and data sent from the FC device to the component circuitry of the receive path circuitry 152A.

When a FC device is initially powered up, the FC device transmits a defined sequence of initialization signals. It is assumed that the initialization signal sequence is defined by the conventional FC protocol, unless stated to the contrary herein. Receive path circuitry 152B may further comprise FC link initialization primitive sequence detection circuitry 160 (hereafter "FC link circuitry 160"). The FC link circuitry 160 may receive an initialization signal sequence generated by an FC device (along data path 166). The initialization signal sequence from an FC device may comprise, for example, an initialization signal sequence that identifies the target device as an FC device. The initialization signal sequence may contain additional information related to the operating frequency (i.e., link frequency) of the FC device.

Upon receipt of such an initialization signal sequence from the FC device, FC link circuitry 160 may generate a command signal 162 to the PLL circuitry 158 (described above). Such a command signal 162 may operate to control the operating frequency of the PLL circuitry 158 so that the PLL operates at the correct frequency for data flow control of the FC device (e.g., 1.5, 3.0, 6.0 GHz). To that end, the PLL circuitry 158 may include frequency multiplier and/or divider circuitry (not shown) that may generate a multiplying (or dividing) signal to enable the PLL circuitry 158 to select base frequency based on the command signal 162, to permit, for example, data flow through the receive path circuitry 152A at an appropriate frequency for the FC device.

In a manner similar to the description above for a SAS device, the receive path circuitry 152A may also include flow control circuitry that may include data tracking PLL circuitry 158 coupled to the internal bus 166. The PLL circuitry 158 may be adapted to receive digital data signals (i.e., data streams) from the FC device, for example, after the FC device is properly initialized by the protocol engine 140. Upon receiving a data stream, PLL circuitry 158 may be operable to compare an incoming data stream against an internally generated clock signal (not shown). If a phase difference exists between the internally generated clock signal and the data stream, the PLL circuitry 158 may also be capable of changing the clock frequency to more closely match the frequency of the data stream. The PLL circuitry 158 may also be capable of generating a data clock signal 158 indicative of the frequency of the incoming data stream. The data clock signal 164 may be sent to retimer circuitry 154. The retimer circuitry 154 may be operable to retime the incoming data stream based, at least in part, on the data clock signal 164 received from the PLL circuitry 158. For example, retimer 154 may comprise a flip flop circuit that has the data stream and the data clock signal for inputs, and may operate to retime the data stream based on the data clock signal. The retimer circuitry 154 may further be operable to generate a retimed data stream at the output of the retimer circuitry 154. Retiming the data stream from a FC device may operate to reduce noise events (for example, ringing effects in the digital signal) which may occur over longer cable lengths. Further, retiming the data stream may operate to reduce these effects below a defined tolerance level.

S-ATA Protocol Sensing and Flow Control

Assume for this example that a S-ATA device is connected to the intermediate device 150, either alone or in combination with other device types in a multiple device enclosure (for example, S-ATA device 104d) as shown in FIG. 2. Commands and data may be communicated into and out of the intermediate device 150, as represented by Rin and Tin, for example, via cable links 106a, 106b . . . 106d and/or 108a, 108b . . . 108d. A data path 166 (e.g., internal bus) may be included in the receive path circuitry 152A to provide communication of commands and data sent from the FC device to the component circuitry of the receive path circuitry 152A.

When a S-ATA device is initially powered-up, an initialization signal sequence may occur. In an exemplary S-ATA device the initialization signal sequence may comprise an OOB signal (similar to the OOB signal described above with reference to a SAS device) but may not include a COMSAS signal. The absence of the COMSAS signal may identify the device as a S-ATA device (instead of a SAS device). OOB signal detection circuitry 156 may operate in a manner similar to the above description of SAS protocol sensing.

Flow control circuitry for a S-ATA device may include one or more S-ATA protocol control circuitry 170 and/or 172, coupled at respective input and output ends of the intermediate device 150. In the conventional S-ATA protocol, when a S-ATA device is receiving data and a transmit/receive buffer (not shown) is almost full, the device transmits a HOLD signal. The S-ATA protocol may require that a hold acknowledge signal (HOLDA) be received by the target device within a predefined number of transmitted data words (for example, with 20 data words). Accordingly, S-ATA protocol control circuitry 170 and/or 172 may be operable to generate an appropriate HOLDA signal when a HOLD signal is received, and return such HOLDA signal to the S-ATA device (e.g. device 104*d*) or to the circuit card 120, as may be required by either the device or the circuit card 120.

In a manner similar to the description above for SAS and FC devices, the flow control circuitry that may also include data tracking PLL circuitry 158 coupled to the internal bus 166. The PLL circuitry 158 may be adapted to receive digital data signals (i.e., data streams) from the FC device, for example, after the FC device is properly initialized by the protocol engine 140. Upon receiving a data stream, PLL circuitry 158 may be operable to compare an incoming data stream against an internally generated clock signal (not shown). If a phase difference exists between the internally generated clock signal and the data stream, the PLL circuitry 158 may also be capable of changing the clock frequency to more closely match the frequency of the data stream. The PLL circuitry 158 may also be capable of generating a data clock signal 158 indicative of the frequency of the incoming data stream. The data clock signal 164 may be sent to retimer circuitry 154. The retimer circuitry 154 may be operable to retime the incoming data stream based, at least in part, on the data clock signal 164 received from the PLL circuitry 158. For example, retimer 154 may comprise a flip flop circuit that has the data stream and the data clock signal for inputs, and may operate to retime the data stream based on the data clock signal. The retimer circuitry 154 may further be operable to generate a retimed data stream at the output of the retimer circuitry 154. Retiming the data stream from an S-ATA device may operate to reduce noise events (for example, ringing effects in the digital signal) which may occur over longer cable lengths. Further, retiming the data stream may operate to reduce these effects below a defined tolerance level.

As described previously herein, the "receive path" 152A and the "transmit path" 152B may comprise identical circuitry to be compatible with sensing and data flow control between a target device 104 and a circuit card 120. For the transmit path circuitry 152B, it should be pointed out that the components thereof may operate in an identical manner as described above with respect to the receive path circuitry 152A, except that signals are coming from the circuit card 120 and going to the target device. Thus, no reference numbers have been assigned to the transmit path circuitry, and it may be assumed herein that like parts called out by a descriptive word or phrase operate in a like manner.

The circuitry described with reference to the intermediate device 150 depicted in FIG. 3 herein may comprise one or more circuit modules or chipsets that may comprise integrated circuits. Alternatively, one or more of the block diagram components of FIG. 3 may be formed of discrete circuitry in a manner consistent with the functionality described herein. It is to be noted that the intermediate device 150 depicted in FIG. 3 may further comprise additional circuitry, for example, buffer circuitry at the input and/or output ends (or at other appropriate locations along the data path). Further, the intermediate device 150 may also include impedance matching circuitry, for example, to match impedances between the target device 104, one or more cables, and the circuit card 120.

FIG. 4 depicts flowchart 400 illustrating exemplary operations that may be performed according to an embodiment. With reference to the intermediate device 150 described herein, operations may include protocol sensing which may comprise an operation of determining the communication protocol 402 that may be used by a target device 104 and/or circuit card 120. Determining the communication protocol, from among a plurality of communication protocols, may include detecting an initialization signal sequence (for example, an OOB signal sequence for an SAS device), detecting a link initialization signal (for example, an analog burst signal for an FC device), and/or detecting a HOLD signal (in the case of an S-ATA device). For example, in the case of an SAS device, for example, the OOB signals may be passed through the intermediate device 150 to the circuit card 120. For a target device compatible with a FC protocol, such a process may include setting PLL circuitry to operate the appropriate frequency upon the occurrence of an FC link initialization signal. For an S-ATA device, a HOLDA signal may be generated back to the S-ATA device within a predetermined number of data words. The process may also include detecting a link frequency corresponding to an attached device. The link frequency may be generated by a target device, and may comprise, for example, the frequency of a data stream generated by the device. The link frequency may operate to establish the operating frequency of PLL circuitry to enable retiming of an incoming data stream.

For a given communication protocol, operations may also include providing data flow control using the selected communication protocol 402. Data flow control operations may include retiming a data stream and/or buffering and/or amplifying a data stream. For example, as described above with reference to FIG. 3, PLL circuitry 158 may operate to introduce generate a phase value for a given data stream, and a retimer circuit 154 may operate to retime the data stream based, at least in part, on the phase value generated by the PLL circuitry 158.

As stated previously, mass storage 104 may comprise an enclosure of target devices. The enclosure may comprise a plurality of target devices, and each device may be compatible with and/or capable of communicating using different communication protocols. Such an enclosure may also include appropriate connections to permit devices to be "hot-swappable", to permit, for example, devices to be connected and disconnected within an enclosure in a dynamic fashion. Thus, such an enclosure may comprise interface connectors (not shown) to provide electrical and mechanical connectivity to devices inserted therein, and to cables (for example cables 108*a*, 108*b* . . . 108*d*) that may be attached thereto.

Also, as can be discerned from the examples provided herein, certain components of the intermediate device 150 may be capable of providing device sensing functions and data flow control for any or all of the devices. For example, PLL circuitry 158 and retimer circuitry 154 are equally operable with SAS, S-ATA and/or FC devices. Therefore, in an enclosure environment permitting different devices to be connected at the same physical location, these components can accommodate such devices. The intermediate device 150 consistent with this embodiment may be operable to accommodate different and/or missing devices from the enclosure. If a device is missing (not connected) at the enclosure level, the intermediate device 150, and more particularly the OOB signal detection circuitry 156, FC link circuitry 160 and/or the retimer circuitry 154 may generate a signal indicative of the fact that no device is present in the enclosure (or unattached to a particular cable).

It should be understood that other embodiments of the present disclosure contemplate many different combinations and/or subcombinations of the components and/or circuitry depicted in FIG. 3, or the system level components of FIGS. 1 and 2. For example, in a system that includes an enclosure environment dedicated to SAS and/or FC devices; the S-ATA protocol control circuits 172 and 170 may be omitted without departing from the scope of the present disclosure.

Other combinations and subcombinations of any of the components, as represented by any of the blocks of FIGS. 1, 2 and or 3, may be made without departing from the present disclosure.

Thus, in summary, one system embodiment may comprise a circuit card comprising an integrated circuit capable of communicating in accordance with a plurality of different communication protocols. The circuit may be capable of being coupled to a bus. An intermediate device may be coupled to the circuit card. The intermediate device may be capable of determining, at least in part, at least one communication protocol, among a plurality of communication protocols, via which at least one storage device connected to the intermediate device is capable of communicating. The intermediate device may also be capable controlling a data stream generated by at least one of the integrated circuit and the storage device.

One apparatus embodiment may include an intermediate device that may comprise protocol sensing circuitry that is capable of determining, at least in part, at least one communication protocol, among a plurality of communication protocols, via which at least one storage device connected to the intermediate device is capable of communicating. The intermediate device may also comprise flow control circuitry that is capable of controlling a data stream that may be communicated from said storage device using a plurality of communication protocols.

Advantageously, the intermediate device of these embodiments may offer enhanced communication capabilities, and may communicate using a plurality of communication protocols. Also advantageously, signals generated by a target device and or circuit card coupled to the intermediate device may be controlled, which may permit cable lengths between the intermediate device and one or more of a target device and/or circuit card to be extended. Further advantageously, this may permit, for example, a single integrated intermediate device according to these embodiments to communicate with a data storage system directly using a plurality of different communication protocols. Thus, for example, it may be possible to use the intermediate device of these embodiments to communicate directly via one or more communication links with one or more devices in SAS and/or S-ATA and/or FC protocol domains in the data storage system, without having to employ one or more external communication protocol converters, translators, and/or expanders (such as, for example, one or more SAS expanders) coupled between the integrated circuit and the data storage system, although such protocol converters, translators, and/or expanders may be used without departing from these embodiments. Advantageously, these features may permit the intermediate device of these embodiments to exhibit enhanced versatility and utility compared to the prior art, and may reduce design costs of employing the intermediate device described herein compared to the prior art.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. An apparatus comprising:
   an intermediate device to be coupled between a storage protocol controller and at least one storage device, and communicating in accordance with a plurality of storage protocols, and including,
   protocol sensing circuitry to determine based on an initialization signal sequence indicative of a storage protocol received from the at least one storage device which one of the plurality of storage protocols via which the at least one storage device to be coupled to the intermediate device is communicating, and
   flow control circuitry to control a data stream between the at least one storage device and the storage protocol controller, wherein the data stream includes the storage protocol determined by the protocol sensing circuitry.

2. The apparatus of claim 1, wherein: the initialization signal sequence comprises an out-of-band signal sequence.

3. The apparatus of claim 1, wherein:
   the protocol sensing circuitry is also capable of receiving at least one of an out-of-band signal sequence and an analog burst signal sequence, and the flow control circuitry comprises data tracking circuitry capable of receiving a data stream from said at least one storage device and also capable of generating a clock signal indicative of the frequency of said data stream, said flow control circuitry also comprising retimer circuitry capable of receiving said data stream and said clock signal and generating a retimed data stream.

4. The apparatus of claim 1, wherein:
   the intermediate device is capable of being coupled, via at least one cable, to said at least one storage device.

5. The apparatus of claim 1, wherein:
   the plurality of different storage protocols comprise a Fibre Channel protocol, a Serial Attached Small Computer System Interface protocol, and a Serial Advanced Technology Attachment protocol.

6. The apparatus of claim 1, wherein:
   the intermediate device is capable of being coupled to a cable compatible with at least one of said storage protocols.

7. The apparatus of claim 1, wherein:
   the intermediate device further comprises protocol control circuitry capable of receiving a signal from said at least one storage device and, in response at least in part thereto, generating an acknowledge signal to be transmitted to said at least one storage device.

8. The apparatus of claim 1, wherein the flow control circuitry is configured to transmit a hold request to the storage protocol controller in response to receiving a hold request from one of the storage devices indicating that a receive buffer of the one of the storage devices is filled above a threshold level and further configured to transmit an acknowledgement signal back to the one of the storage devices in response thereto.

9. The apparatus of claim 1, wherein the storage protocol controller is a multi-protocol initiator engine and the at least one storage device is a target storage device.

10. A system, comprising:
    at least one the intermediate device communicating storage protocol controller being coupled with a bus;
    a storage enclosure including a plurality of storage devices, wherein two or more of the storage devices are combined in a Redundant Array of Inexpensive Disk (RAID) configuration, and each storage device is communicating in accordance with one of Serial Attached SCSI (SAS), Serial Advanced Technology Attachment (SATA) and Fibre Channel (FC) storage protocol;

an intermediate device coupled between the storage protocol controller and the storage enclosure, and communicating in accordance with a plurality of storage protocols, and including,
protocol sensing circuitry to determine based on an initialization signal sequence indicative of a storage protocol received from the at least one of the storage devices in the storage enclosure which one of the plurality of storage protocols via which the at least one storage device to be coupled to the intermediate device is communicating, and
flow control circuitry to control a data stream between the at least one storage device and the storage protocol controller, wherein the data stream includes the storage protocol determined by the protocol sensing circuitry.

11. The system of claim 10, wherein:
the intermediate device is coupled to said storage protocol controller and said at least one of the plurality of storage devices via one or more cables.

12. The system of claim 10, wherein:
the initialization signal sequence comprises an out-of-band signal sequence.

13. The system of claim 10, wherein:
the intermediate device is further capable of controlling said data stream to produce a retimed data stream, and transmitting the retimed data stream to at least one of the at least one storage protocol controller and the at least one of the plurality of storage devices.

14. The system of claim 10, wherein:
the plurality of different storage protocols comprise a Fibre Channel protocol, a Serial Attached Small Computer System Interface protocol, and a Serial Advanced Technology Attachment protocol.

15. The system of claim 10, wherein the flow control circuitry is configured to transmit a hold request to the storage protocol controller in response to receiving a hold request from one of the storage devices indicating that a receive buffer of the one of the storage devices is filled above a threshold level and further configured to transmit an acknowledgement signal back to the one of the storage devices in response thereto.

16. A method comprising:
determining by an intermediate device supporting a plurality of storage protocols, based on an initialization signal sequence indicative of a storage protocol received from at least one storage device which one of the plurality of storage protocols via which said at least one storage device coupled with the intermediate device is communicating; and controlling, by the intermediate device,
at least one data stream being communicated in accordance with the one storage protocol from said at least one storage device to a storage protocol controller.

17. The method of claim 16, further comprising:
retiming, by the intermediate device, said at least one data stream generated by said at least one storage device.

18. The method of claim 16, further comprising:
determining, by the intermediate device, a link frequency associated with said at least one storage device; and
communicating, by said intermediate device with said at least one storage device using said link frequency.

19. The method of claim 16, further comprising:
communicating, by the intermediate device with said at least one storage device with a selected storage protocol among the plurality of storage protocols.

20. The method of claim 16, further comprising:
transmitting a first hold request from the intermediate device to the storage protocol controller in response to receiving a second hold request from the at least one storage device, the second hold request indicating that a receive buffer of the at least one storage device is full or almost full; and
transmitting an acknowledgement signal from the intermediate device back to the at least one storage device in response to receiving the first hold request.

21. An article comprising:
a storage medium having stored thereon instructions that when executed by a machine result in the following operations:
determining by an intermediate device supporting a plurality of storage protocols based on an initialization signal sequence indicative of a storage protocol received from a storage device, which one of the plurality of storage protocols via which the at least one storage device coupled with the intermediate device is communicating; and
controlling, by the intermediate device, at least one data stream being communicated in accordance with the one storage protocol from said at least one storage device to a storage protocol controller.

22. The article of claim 21, further comprising the following operations:
retiming, by the intermediate device, said at least one data stream generated by said at least one storage device.

23. The article of claim 21, further comprising the following operations:
determining, by the intermediate device, a link frequency associated with said at least one storage device; and
communicating, by said intermediate device with said at least one storage device using said link frequency.

24. The article of claim 21, further comprising the following operations:
communicating, by the intermediate device with said at least one storage device with a selected storage protocol among the plurality of storage protocols.

25. The article of claim 21, further comprising:
transmitting a first hold request from the intermediate device to the storage protocol controller in response to receiving a second hold request from said at least one storage device, the second hold request indicating that a receive buffer of said at least one storage device is full or almost full; and
transmitting an acknowledgement signal from the intermediate device back to said at least one storage device in response to receiving the first hold request.

* * * * *